US009770780B2

(12) United States Patent
Golovashchenko et al.

(10) Patent No.: US 9,770,780 B2
(45) Date of Patent: Sep. 26, 2017

(54) PULSE JOINING CARTRIDGES

(71) Applicant: Ford Global Technologies, LLC, Dearborn, MI (US)

(72) Inventors: Sergey Fedorovich Golovashchenko, Beverly Hills, MI (US); John Joseph Francis Bonnen, Milford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/170,056

(22) Filed: Jun. 1, 2016

(65) Prior Publication Data

US 2016/0271724 A1  Sep. 22, 2016

Related U.S. Application Data

(62) Division of application No. 14/577,017, filed on Dec. 19, 2014, now Pat. No. 9,421,636.

(51) Int. Cl.
*B23K 20/00* (2006.01)
*B23K 20/06* (2006.01)
(Continued)

(52) U.S. Cl.
CPC ............ *B23K 20/06* (2013.01); *B23K 20/002* (2013.01); *B23K 20/22* (2013.01);
(Continued)

(58) Field of Classification Search
CPC ...... B23K 20/06; B23K 20/002; B23K 20/22; B23K 2201/06; B23K 2203/15;
(Continued)

(56) References Cited

U.S. PATENT DOCUMENTS 3,502,840 A  3/1970 Khrenov et al.
3,520,049 A  7/1970 Lysenko et al.
(Continued)

FOREIGN PATENT DOCUMENTS

DE  102006050292 A1 * 4/2008  ............. B23K 20/06
EP  1108768 A2  6/2001
(Continued)

OTHER PUBLICATIONS

A Vivek, et al., Journal of Materials Processing Technology, Vaporizing foil actuator: A tool for collision welding, Jul. 16, 2013.
(Continued)

*Primary Examiner* — Kiley Stoner
(74) *Attorney, Agent, or Firm* — Damian Porcari; Brooks Kushman P.C.

(57) ABSTRACT

A pulsed joining tool includes a tool body that defines a cavity that receives an inner tubular member and an outer tubular member and a pulse joining cartridge. The tubular members are nested together with the cartridge being disposed around the outer tubular member. The cartridge includes a conductor, such as a wire or foil, that extends around the outer tubular member and is insulated to separate a supply segment from a return segment. A source of stored electrical energy is discharged through the conductor to join the tubular members with an electromagnetic force pulse.

16 Claims, 3 Drawing Sheets

(51) Int. Cl.
*B23K 20/22* (2006.01)
*B23K 103/18* (2006.01)
*B23K 103/08* (2006.01)
*B23K 103/10* (2006.01)
*B23K 103/20* (2006.01)
*B23K 103/16* (2006.01)
*B23K 101/06* (2006.01)

(52) U.S. Cl.
CPC ...... *B23K 2201/06* (2013.01); *B23K 2203/08* (2013.01); *B23K 2203/10* (2013.01); *B23K 2203/15* (2015.10); *B23K 2203/172* (2015.10); *B23K 2203/18* (2013.01); *B23K 2203/20* (2013.01)

(58) Field of Classification Search
CPC ............ B23K 2203/08; B23K 2203/10; B23K 2203/20; B23K 2203/172; B23K 2203/18
USPC .................................................. 228/3.1, 115
See application file for complete search history.

(56) References Cited

U.S. PATENT DOCUMENTS

| | | | |
|---|---|---|---|
| 3,528,596 A | 9/1970 | Carlson | |
| 3,560,693 A | 2/1971 | Morin, Jr. | |
| 3,603,759 A | 9/1971 | Peacock | |
| 3,699,297 A | 10/1972 | Grin et al. | |
| 3,851,139 A * | 11/1974 | Rudd | B21D 26/14 219/101 |
| RE29,016 E | 10/1976 | Peacock | |
| 4,103,813 A | 8/1978 | Debeir | |
| 4,129,846 A | 12/1978 | Yablochnikov | |
| 4,150,274 A | 4/1979 | Minin et al. | |
| 4,504,714 A | 3/1985 | Katzenstein | |
| 4,607,778 A | 8/1986 | Oakley et al. | |
| 5,824,998 A | 10/1998 | Livshiz et al. | |
| 5,966,813 A | 10/1999 | Durand | |
| 5,981,921 A | 11/1999 | Yablochnikov | |
| 6,229,125 B1 | 5/2001 | Livshiz et al. | |
| 6,234,375 B1 | 5/2001 | Durand | |
| 6,255,631 B1 | 7/2001 | Kichline, Jr. et al. | |
| 6,379,254 B1 | 4/2002 | Yablochnikov | |
| 6,389,697 B1 | 5/2002 | Benoit et al. | |
| 6,474,534 B2 | 11/2002 | Gabbianelli et al. | |
| 6,561,722 B1 | 5/2003 | Dudko et al. | |
| 6,693,251 B1 | 2/2004 | Ananthanarayanan et al. | |
| 6,812,439 B1 | 11/2004 | Durand | |
| 6,817,511 B2 | 11/2004 | Durand | |
| 6,860,013 B1 | 3/2005 | Durand | |
| 6,892,929 B2 | 5/2005 | Yablochnikov | |
| 6,908,024 B2 | 6/2005 | Martin et al. | |
| 6,910,617 B2 | 6/2005 | Yablochnikov | |
| 6,921,013 B1 | 7/2005 | Kichline, Jr. et al. | |
| 7,025,245 B2 * | 4/2006 | Gust | B23K 13/01 228/102 |
| 7,959,057 B2 | 6/2011 | Criqui | |
| 8,360,301 B2 | 1/2013 | Danaj et al. | |
| 8,393,525 B2 | 3/2013 | Gafri et al. | |
| 9,266,190 B2 | 2/2016 | Bonnen et al. | |
| 2003/0173355 A1 | 9/2003 | Yablochnikov | |
| 2004/0074056 A1 | 4/2004 | Goetzinger et al. | |
| 2004/0112942 A1 | 6/2004 | Durand | |
| 2005/0051539 A1 | 3/2005 | Yablochnikov et al. | |
| 2005/0109769 A1 | 5/2005 | McClure et al. | |
| 2005/0205553 A1 | 9/2005 | Cheng et al. | |
| 2006/0081684 A1 | 4/2006 | Moore | |
| 2006/0131300 A1 | 6/2006 | Yablochnikov | |
| 2006/0138769 A1 | 6/2006 | Fischer | |
| 2006/0144903 A1 | 7/2006 | Perry et al. | |
| 2006/0185412 A1 | 8/2006 | Shao et al. | |
| 2006/0208481 A1 * | 9/2006 | Fischer | B21D 26/14 285/258 |
| 2006/0289479 A1 | 12/2006 | Gafri et al. | |
| 2007/0240897 A1 | 10/2007 | Gafri et al. | |
| 2008/0072584 A1 * | 3/2008 | Cai | F01N 13/1805 60/322 |
| 2008/0264130 A1 | 10/2008 | Blakely et al. | |
| 2009/0050676 A1 | 2/2009 | Criqui | |
| 2010/0108666 A1 | 5/2010 | Gafri et al. | |
| 2010/0242284 A1 * | 9/2010 | Danaj | B23K 20/06 29/897.2 |
| 2010/0294484 A1 * | 11/2010 | Castillo | E21B 33/1216 166/179 |
| 2011/0100979 A1 | 5/2011 | Keong et al. | |
| 2012/0010709 A1 | 1/2012 | Wilson et al. | |
| 2013/0086961 A1 * | 4/2013 | Yablochnikov | B23K 20/06 72/56 |
| 2013/0133542 A1 | 5/2013 | Morris et al. | |
| 2013/0236244 A1 | 9/2013 | Yablochnikov et al. | |
| 2014/0124075 A1 | 5/2014 | Smith et al. | |
| 2014/0125024 A1 | 5/2014 | Deierling et al. | |
| 2015/0328712 A1 | 11/2015 | Grubb | |
| 2016/0001392 A1 | 1/2016 | Bonnen et al. | |
| 2016/0039041 A1 | 2/2016 | Bonnen et al. | |
| 2016/0263695 A1 * | 9/2016 | Schoorl | B23K 20/08 |

FOREIGN PATENT DOCUMENTS

| | | | |
|---|---|---|---|
| EP | 2803439 A1 | 11/2014 | |
| FR | 2034088 A1 | 12/1970 | |
| FR | 2406454 A1 | 11/2001 | |
| GB | 2480519 A * | 11/2011 | B23K 20/06 |
| JP | 5706021 B1 | 4/2015 | |
| WO | WO 0018526 A2 * | 4/2000 | B21D 26/14 |
| WO | 2007132468 A1 | 11/2007 | |

OTHER PUBLICATIONS

International Searching Authority, International Search Report for International Application No. PCT/US2015/33348 mailed Oct. 23, 2015.

* cited by examiner

PULSE JOINING CARTRIDGES

CROSS-REFERENCE TO RELATED APPLICATIONS

This application is a division of U.S. application Ser. No. 14/577,017, filed Dec. 19, 2014, the disclosure of which is hereby incorporated in its entirety by reference herein.

STATEMENT REGARDING FEDERALLY SPONSORED RESEARCH OR DEVELOPMENT

The invention was made with Government support under Contract No. DE-EE0006432 awarded by the Department of Energy. The Government has certain rights to the invention.

TECHNICAL FIELD

This disclosure relates to a conductor disposed in a cartridge for a pulse welding tool or a pulse clinching tool that is used to join two tubular members by welding or clinching when the conductor is discharged.

BACKGROUND

Significant amounts of aluminum and magnesium alloys are being included in vehicle body architecture, especially in the passenger compartment safety cage, or "greenhouse," as a result of the need to introduce more lightweight alloys with higher specific strengths and stiffness. Lightweight alloys frequently must be joined to high strength ferrous materials to meet design and regulatory requirements. Dissimilar metal joints (such as boron steel to 6xxx series aluminum) are now being specified in structures that are subject to specified safety standards.

Mechanical joints, such as rivets or flow drill screws may be used to join dissimilar materials but the strength, durability, and corrosion resistance of such joints does not match the properties of similar material welds.

Extrusions and hydro-formed parts are very attractive for the safety cage and specifically the roof rail Body-In-White (BIW) construction because they can achieve very high stiffness and offer much better material utilization compared to sheet metal parts of similar mild steel configurations with welded flanges. A major roadblock to broad implementation of extrusions and hydro-formed parts is the lack of affordable mass production joining methods to integrate these parts into BIW structures. Joining methods such a resistance welding, MIG welding, TIG welding, and spin stir friction welding generate heat may introduce dimensional distortion and may detrimentally impact the microstructure or material properties of the parts made of special heat treatable alloys.

Several different types of joining methods are currently available and may be categorized as one-sided or two-sided methods. One-sided joining methods are critical to the implementation of extrusion to extrusion joining because of access problems relating to the closed internal voids in some extrusions. One-sided joining methods such as flow drill screws add cost to the assemblies and are not well suited to high strength steel parts. Two-sided joining methods such as self-piercing rivets and clinch joints require access to the back side of a joint and are difficult to use in some applications where extrusions or tubular parts are joined.

The above problems and other problems are addressed by this disclosure as summarized below.

SUMMARY

According to one aspect of this disclosure, a pulsed joining tool is disclosed that includes a tool body and a cartridge. The tool body defines a cavity for receiving two nested tubular members. The cartridge is disposed in the cavity and includes a supply conductor and a return conductor extending circumferentially from an entry point to a reversal point. Electrical insulation isolates the extrusions, clamps, supply conductor and return conductor. A source of stored electrical energy is discharged through the supply and return conductors to join the tubular members with an Electro-Magnetic Force (EMF) pulse.

According to other aspects of this disclosure, the pulsed joining tool may include at least two parts that are separable for loading and unloading the tubular members. A mandrel may be inserted inside the tubular members to support the tubular members when the source of stored electrical energy is discharged through the supply and return conductors. The mandrel supports the tubular members in an expanded position and is radially retracted in a retracted position to remove the mandrel from the tubular members.

According to other aspects of this disclosure, the insulation material may be a plastic casing that encases the loop of wire.

The tool may include a first part and a second part that are separable by an actuator that moves the first and second parts between an open position and a closed position.

According to other aspects of this disclosure, a tool is disclosed for joining tubular parts that includes a body defining a cavity receiving overlapping portions of the tubular parts. A cartridge supports a conductor that extends around the overlapping portions. The conductor includes a supply segment extending around the overlapping portions in a first rotational direction to a reversal point and a return segment extending around the overlapping portion in a second rotational direction away from the reversal point. The supply segment and the return segment are insulated from each other. A source of stored electrical energy is discharged through the supply segment and the return segment in opposite rotational directions to create an electromagnetic pulse for joining the tubular members together.

According to additional aspects of this disclosure as it relates to the tool, the tool may include a first part and a second part that are separable by an actuator that moves the first and second parts between an open position and a closed position. The tool may further comprise a mandrel inserted inside the tubular members to support the tubular members when the source of stored electrical energy is discharged through the supply and return segments.

The body may define a port through which the conductor enters the cavity. The entry point is spaced and/or insulated from the reversal point to prevent arcing between the entry point and the reversal point.

According to another aspect of this disclosure, a method of joining an inner tubular member and an outer tubular member together is disclosed that includes the steps of loading the tubular members into a tool that defines a receptacle, inserting a cartridge into the receptacle and discharging electrical energy through the conductor to join the tubular members together. The cartridge includes a conductor having a first run and a second run that are separated by an insulator and partially extend about the tubular members to a reversal point. The conductor defines a circumferential gap between an entry port into the cartridge and the reversal point. Electrical energy from a stored source of electrical energy, such as a bank of capacitors, is discharged through the conductor to create an electro-magnetic pulse to join the tubular members together.

The source of stored electrical energy is discharged through the supply segment and the return segment in opposite rotational directions to create the electromagnetic pulse joining the tubular members together. The conductor may be a wire or a foil. The cartridge may be formed of a polymeric material. The circumferential gap is sufficient to prevent arcing between the entry port and the reversal point. The method may further comprise the step of nesting the tubular members together with overlapping portions of the tubular members being disposed inside the tool. The tubular parts may be welded together or clinched together depending, in part, upon the force of the discharge.

The above aspects of this disclosure and other aspects are described below in greater detail with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
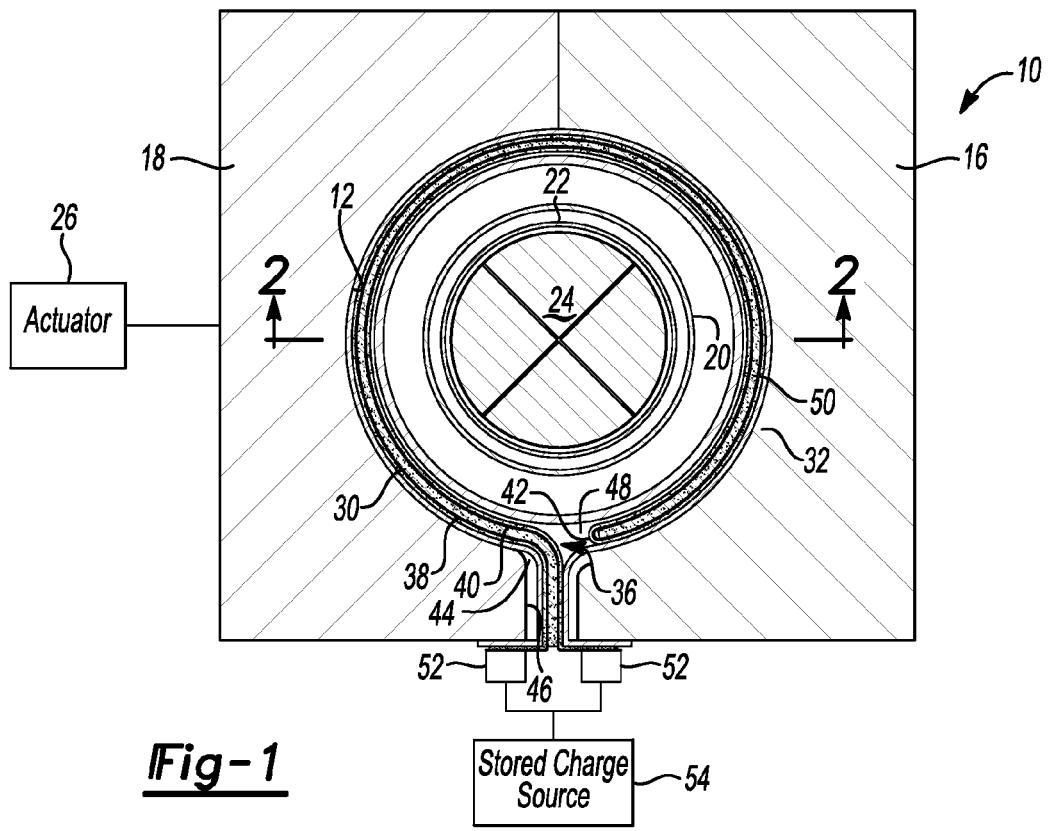
FIG. 1 is a diagrammatic cross-sectional view of a pulse joining tool including a cartridge assembly and tubular members disposed within a chamber defined by the tool according to one embodiment of this disclosure.
Figure 2:
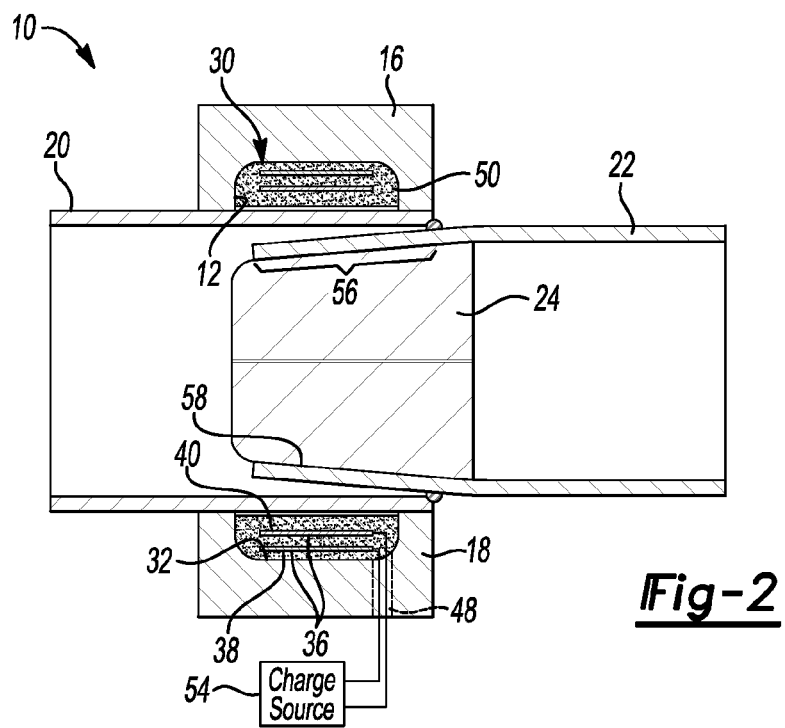
FIG. 2 is a diagrammatic cross-sectional view taken along the line 2-2 in FIG. 1.

Referring to FIGS. 1 and 2, a pulse joining tool 10 is shown that defines a cavity 12. The pulse joining tool 10 includes a first tool part 16 and a second tool part 18. The first and second tool parts 16 and 18 are opened and closed to receive an outer tubular member 20 and an inner tubular member 22. The inner tubular member 22 is backed by a mandrel 24 that supports the inner tubular member 22 during the pulse joining operation. The mandrel 24 is a conventional expandable mandrel that is retracted to fit inside the inner tubular member, expanded to support the inner tubular member and retracted to remove the inner tubular member from the mandrel 24. An actuator 26 is diagrammatically illustrated to be attached to the second tool part 18 for moving the second tool part 18 relative to the first tool part 16. It should be understood that two actuators could be used or the actuator could be attached to the first tool part 16.

Figure 2A:
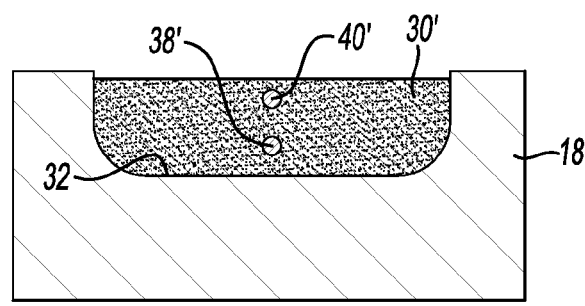
FIG. 2A is a fragmentary cross-sectional view of an alternative embodiment of a cartridge including a wire conductor disposed in the tool.

A cartridge generally indicated by reference numeral 30 is shown to be received in a receptacle 32. The receptacle 32 is defined by the pulse joining tool 10 within the cavity 12, as shown and described with reference to FIG. 2 below. The cartridge 30 includes a conductor 36 that may be a foil conductor (as shown) or a wire conductor as shown in FIG. 2A. The conductor 36 includes a supply run 38, conductor or wire segment, and a return run 40, conductor or wire segment, that extends circumferentially around the outer tubular member 20. The supply run 38 and return run 40 meet at a reversal point 42. DC current flowing through the supply run 38 flows in a first circumferential direction (i.e., clockwise) from an entry point 44 into the receptacle 32 until it reaches the reversal point 42. After current flows past the reversal point 42, it flows in the opposite circumferential direction (i.e., counter-clockwise) through the return run 40. The supply run 38 and return run 40 enter the joining tool 10 through a port 46. The port 46, as shown in FIG. 1, is defined between the first tool part 16 and second tool part 18. However, it should be understood that the conductor 36 may also enter the cavity 12 from the side of the tool 10 in which case no port would be required to be formed through the tool 10.

A gap 48 is defined between the entry point 44 and the reversal point 42. The gap 48 may be an air gap or may be filled with insulation similar to the insulation 50 that encapsulates the supply run 38 and return run 40 of the conductor 36. The gap 48 is provided to prevent arcing between the entry point 44 and the reversal point 42. The conductor 36 nearly completely encircles the outer tube 20 to provide a relatively continuous circumferential EMF that is applied to the outer tube 20. The gap 48 is necessary to prevent arcing between the entry point 44 and the reversal point 42. The gap 48 may be expanded as needed to prevent arcing by shortening the conductor 36.

Insulation 50 is provided on the supply run 38 and return run 40 of the conductor 36. Insulation 50 may be a polymeric material or other suitable insulator that can prevent arcing between the supply run 38 and return run 40.

Terminals 52 are provided on the tool 10. The terminals 52 are provided to allow electrical connection between the tool 10 and a stored power source 54. The stored power source 54 may be a capacitor bank (or inductor bank) that is capable of storing power that is discharged to the pulse joining tool 10.

Referring specifically to FIG. 2, the inner tubular member 22 includes a tapered end. The tapered end facilitates welding the outer tubular member 20 to the inner tubular member 22 as the outer tubular member 20 is compressed by the EMF into engagement with the inner tubular member 22 beginning at the widest portion of the tapered end 58.

Figure 3:
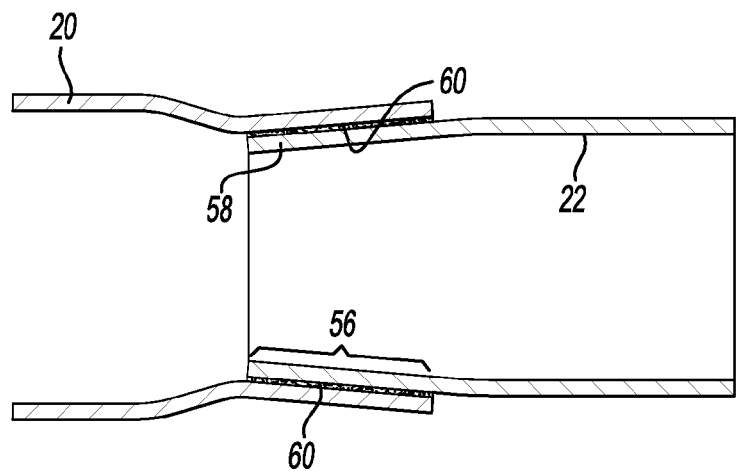
FIG. 3 is a cross-sectional view of two tubular members shown welded together by the pulse joining tool shown in FIG. 1.

Referring to FIG. 3, an outer tubular member 20 is shown connected to an inner tubular member 22 by a weld 60 that is formed by the pulse joining tool 10. The weld 60 is formed between the overlapping portions 56 of the outer tubular member 20 and the inner tubular member 22.

Figure 4:
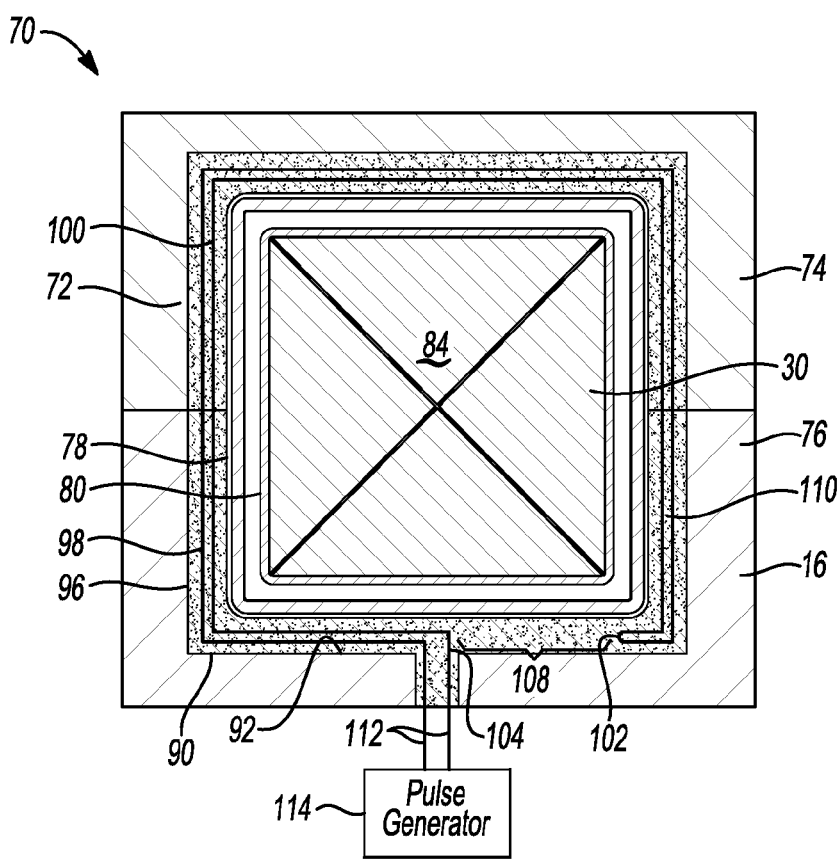
FIG. 4 is a diagrammatic cross-sectional view of an alternative embodiment of a pulse joining tool having a square chamber for joining two square tubular members made according to another embodiment of this disclosure.

Referring to FIG. 4, an alternative embodiment of a pulse joining tool 70 is shown that includes a cavity 72 that is square in shape. A first tool part 74 and a second tool part 76 are disposed within the cavity 72. The tool parts 74 and 76 are square tubular members in the embodiment of FIG. 4. It should be understood that this disclosure of pulse joining tools and methods is not limited to round or square tubular members, but can also be applied to rectangular tubular members, tubular members having rounded ends and flat sides, and any other conventionally shaped tubular members. Inner tubular member 80 is supported by the mandrel 84. A cartridge 90 is received within a receptacle 92 defined within the cavity 72 of the tool 70. The cartridge 90 includes a conductor 96 that is a wire conductor. The conductor 96 includes a supply wire segment 98 and a return wire segment 100 that conduct current between a reversal point 102 and an entry point 104. When discharged, current flows in one circumferential direction through the supply run 98 and in the opposite circumferential direction through the return wire segment 100. A gap 108 is defined between the reversal point 102 and entry point 104 and may be insulated to prevent arcing between the reversal point 102 and the entry point 104. Insulation 110 is provided about the supply run 98 and return run 100 of the conductor 96 to prevent arcing between the supply run 98 and the return run 100. Terminals 112 are provided on the tool 70 to connect the tool 70 to a stored power source 114. The stored power source, or pulse, may be a capacitor bank, or the like.

Figure 5:
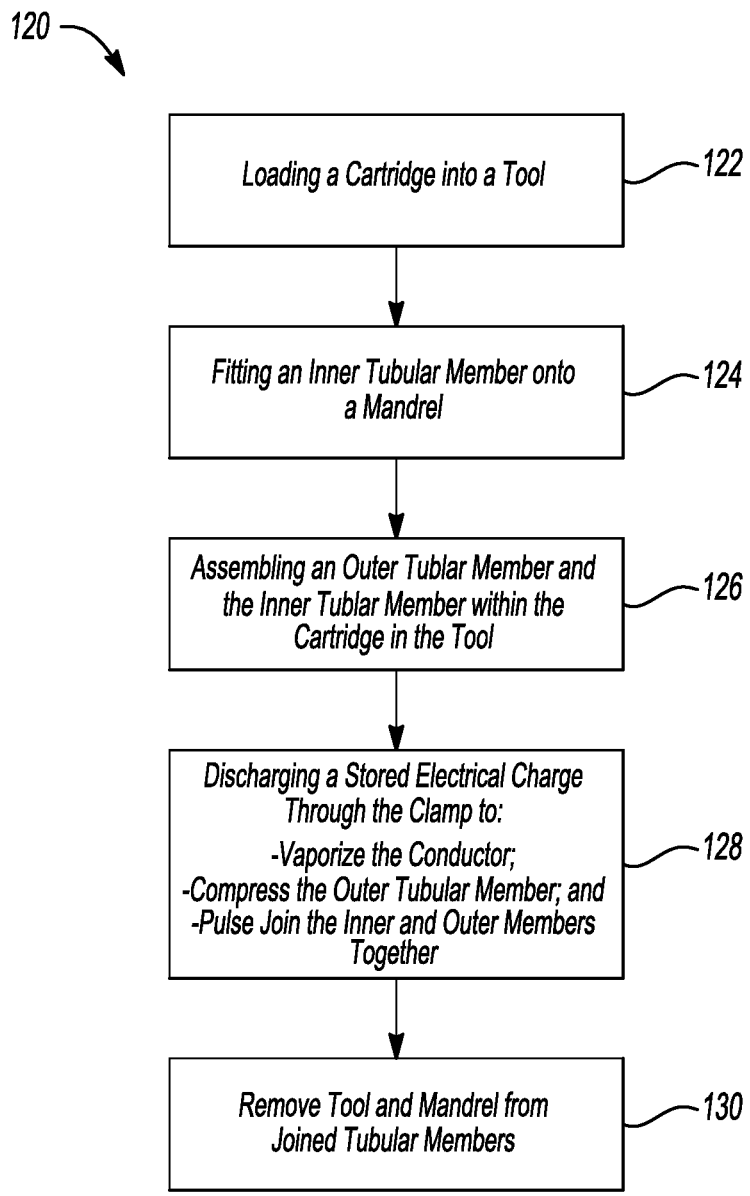
FIG. 5 is a flowchart of the method of joining two tubular members according to this disclosure.

Referring to FIG. 5, the pulse joining method is illustrated and generally indicated by reference numeral 120. The pulse joining method begins by loading a cartridge 30, as previously described, into a pulse joining tool 10 at 122. An inner tubular member is fitted onto a mandrel at 124. An outer tubular member and the inner tubular member are assembled together at 126 within the cartridge in the cartridge 30 in the tool 10. A stored electric charge is discharged at 128 through the tool to vaporize the conductor 36, compressing the outer tubular member and thereby pulse joining the inner and outer tubular members together. Pulse joining the inner and outer tubular members together may result in formation of a weld or a clinch joint between the inner and outer tubular members. After discharge, the tool and retractable mandrel may be removed from the now joined tubular members at 130.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of joining an inner tubular member and an outer tubular member together comprising:
    inserting a cartridge into a receptacle, the cartridge including a conductor having a first run and a second run that are separated by an insulator, wherein the conductor defines a circumferential gap between an entry port into the cartridge and a reversal point;
    loading the tubular members into a tool that defines a receptacle for the cartridge; and
    discharging stored electrical energy through the first run in a first circumferential direction to the reversal point and through the second run in a second circumferential direction creating an electro-magnetic pulse that joins the tubular members together.

2. The method of claim 1 wherein the stored electrical energy is discharged through the first run and the second run in opposite circumferential directions to create the electro-magnetic pulse joining the tubular members together.

3. The method of claim 1 wherein the conductor is a wire.

4. The method of claim 1 wherein the conductor is a foil.

5. The method of claim 1 wherein the cartridge is formed of a polymeric material.

6. The method of claim 1 wherein the circumferential gap is sufficient to prevent arcing between the entry port and the reversal point.

7. The method of claim 1 further comprising:
    nesting the tubular members together with overlapping portions of the tubular members being disposed inside the tool.

8. A tube joining method comprising:
    providing a cartridge defining an opening, wherein first and second conductors separated by an insulator partially extend about the opening;
    loading the cartridge into a tool;
    inserting two nested tubular members into the opening; and
    discharging stored electrical energy in a first direction through the first conductor to a reversal point and in a second direction through the second conductor creating a circular electro-magnetic pulse that joins the tubular members.

9. The method of claim 8 wherein the stored electrical energy is discharged through the first and second conductors in opposite circumferential directions.

10. The method of claim 8 wherein the first and second conductors are wire segments.

11. The method of claim 8 wherein the first and second conductors are foil strips.

12. The method of claim 8 wherein the cartridge is formed of a polymeric material.

13. The method of claim 8 wherein a circumferential gap is defined by the first and second conductors between an entry point where the first and second conductors enter the cartridge and the reversal point, wherein the gap prevents arcing between the entry point and the reversal point.

14. The method of claim 8 wherein the nested tubular members have overlapping portions disposed inside the tool.

15. The method of claim 8 wherein the tubular members to be joined are cylindrical tubes.

16. The method of claim 8 wherein the tubular members to be joined have a plurality of flat walls.

* * * * *